(No Model.)  
4 Sheets—Sheet 1.

E. T. JONES.
MACHINE FOR MAKING BAGGAGE CHECKS.

No. 266,370. Patented Oct. 24, 1882.

WITNESSES:  
Geo. B. Collier  
Geo. J. Kelly

INVENTOR  
Ellis T. Jones,  
by Collier & Bell  
attys.

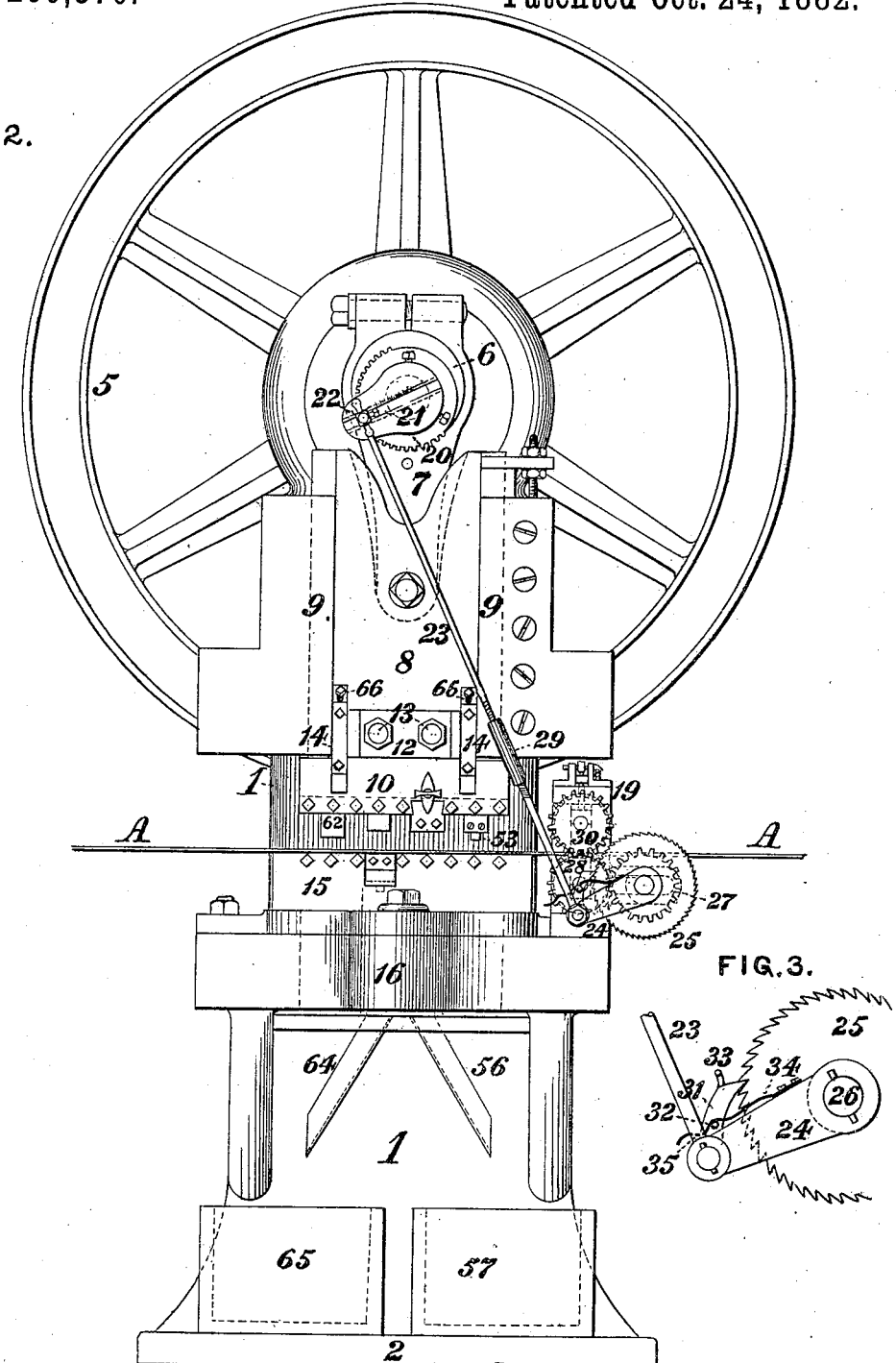

(No Model.) 4 Sheets—Sheet 3.

E. T. JONES.
MACHINE FOR MAKING BAGGAGE CHECKS.

No. 266,370. Patented Oct. 24, 1882.

(No Model.) 4 Sheets—Sheet 4.

E. T. JONES.
MACHINE FOR MAKING BAGGAGE CHECKS.

No. 266,370. Patented Oct. 24, 1882.

WITNESSES:
Geo. B. Collier
Geo. T. Kelly

INVENTOR
Ellis T. Jones,
by Collier & Bell
attys.

N. PETERS, Photo-Lithographer, Washington, D. C.

UNITED STATES PATENT OFFICE.

ELLIS T. JONES, OF NEW YORK, N. Y., ASSIGNOR TO THE HOOLE MANUFACTURING AND BAGGAGE CHECK COMPANY, OF SAME PLACE.

MACHINE FOR MAKING BAGGAGE-CHECKS.

SPECIFICATION forming part of Letters Patent No. 266,370, dated October 24, 1882.

Application filed April 28, 1882. (No model.)

*To all whom it may concern:*

Be it known that I, ELLIS T. JONES, of the city, county, and State of New York, have invented certain new and useful Improvements in the Manufacture of Baggage-Checks and other Sheet-Metal Articles, of which improvements the following is a specification.

The object of my invention is to economize time, labor, and material in the manufacture baggage and pay checks, tags, counters, and other analogous articles of sheet metal by providing effective and desirable means for the production of the same in quantity with rapidity, uniformity in shape, size, and designation, and the least practicable waste of metal.

To this end my improvements consist in certain novel mechanism for adjusting, feeding, and maintaining a blank of metal in proper relation to a series of punches and dies, and actuating said punches in such manner as to successively slot, print, and cut or shape from the material of the blank a series of articles of required form and designation.

The improvements claimed are hereinafter more fully set forth.

Figure 1:
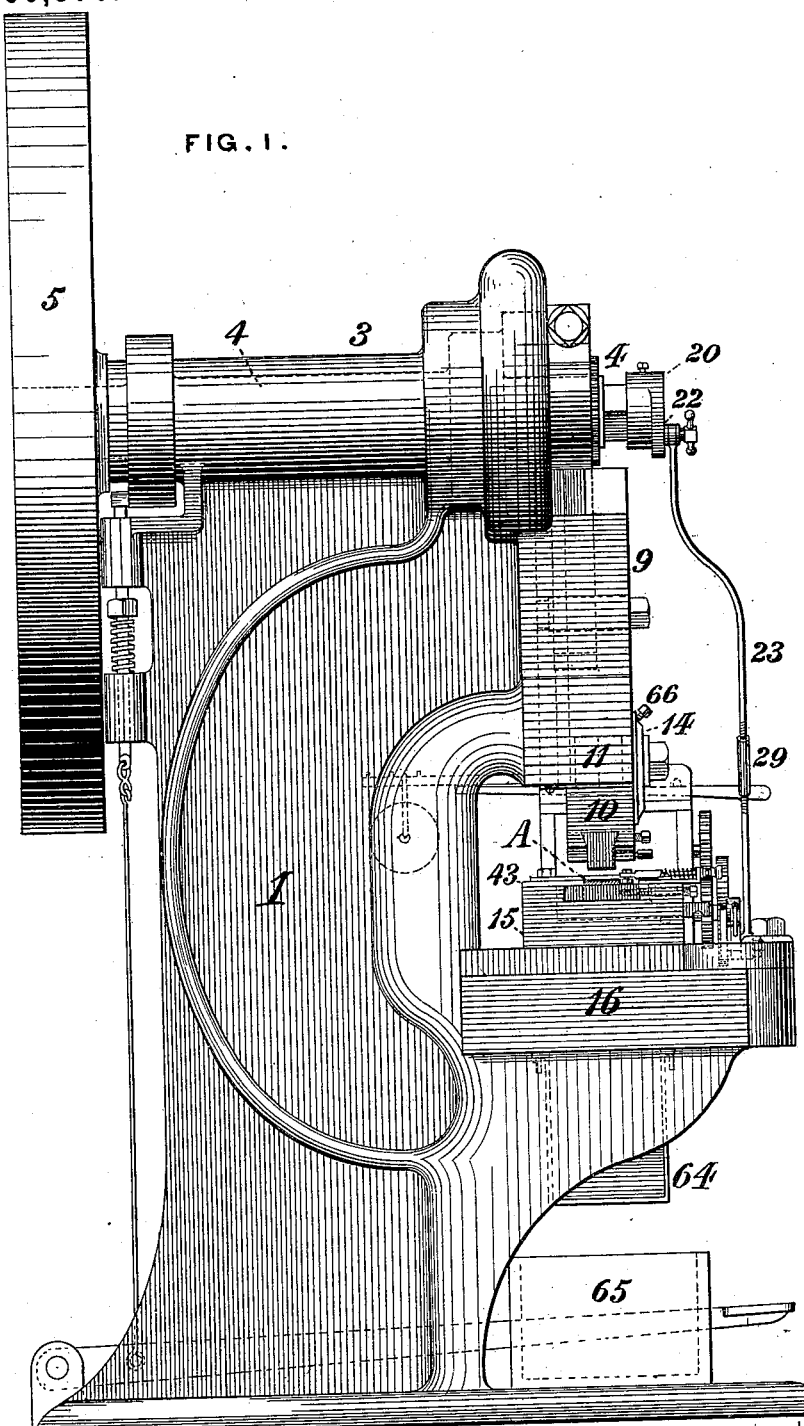
Figure 4:
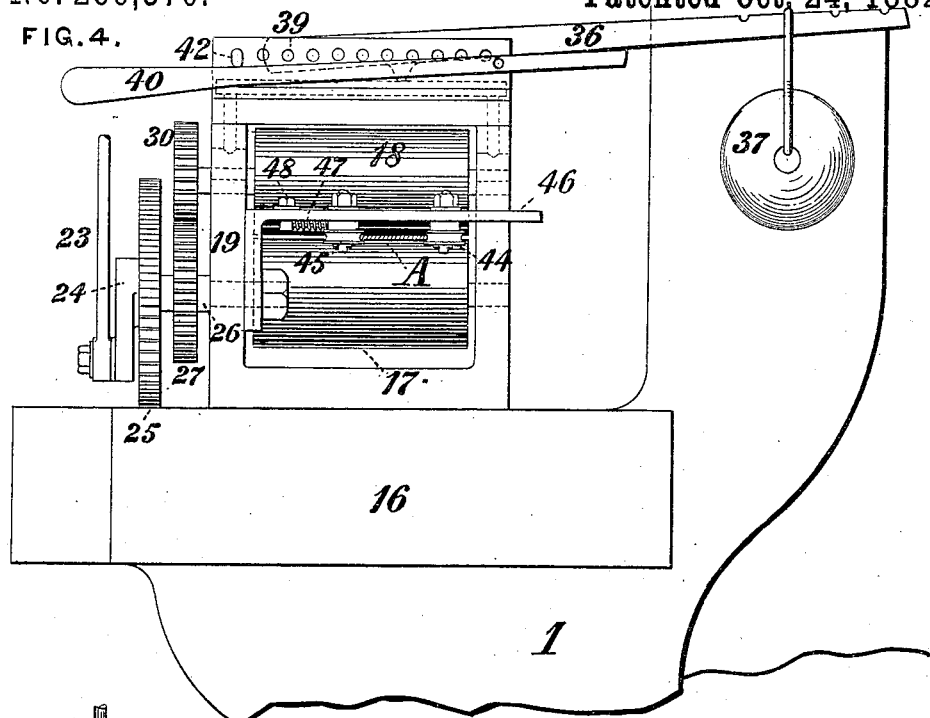
Figure 5:
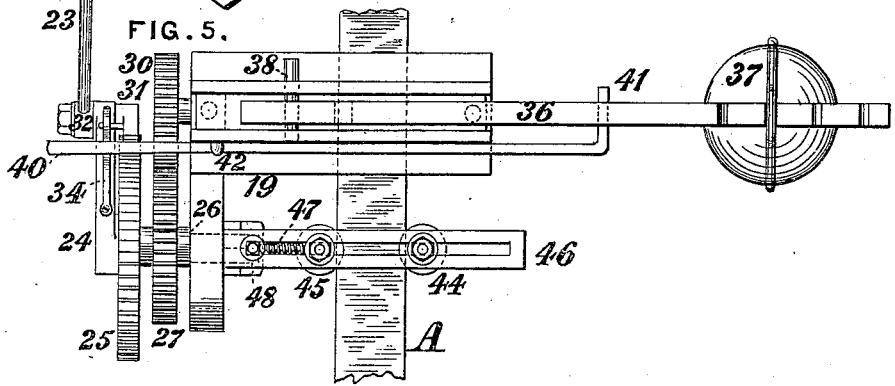
Figure 6:
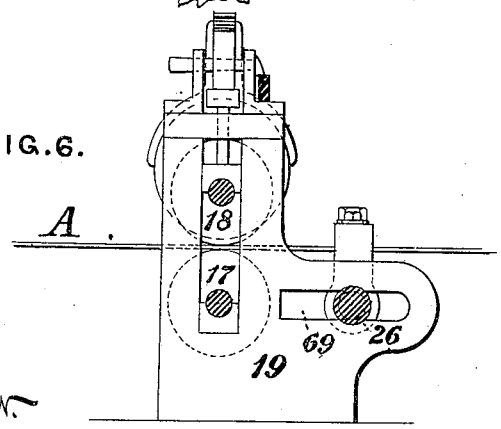
Figure 7:
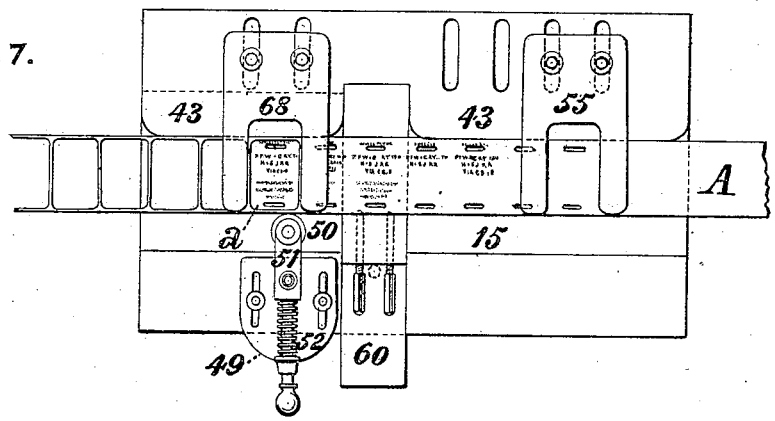
Figure 8:
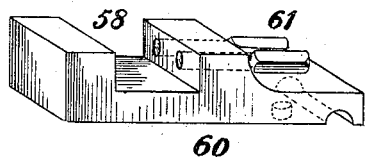
Figure 9:
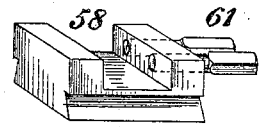
Figure 10:
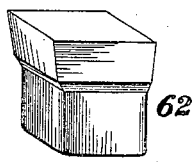
Figure 12:
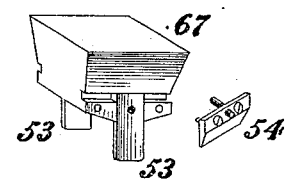
Figure 11:
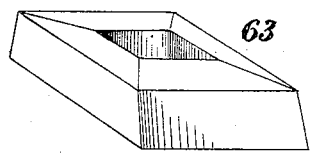
Figure 13:
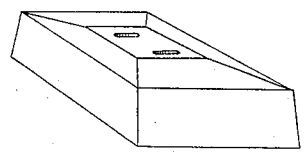
Figure 14:
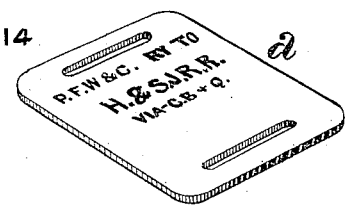

In the accompanying drawings, Figure 1 is a side view, in elevation, of a machine for making baggage-checks in accordance with my invention; Fig. 2, a front view of the same; Fig. 3, a view on an enlarged scale of the pawl-and-ratchet mechanism of the feed; Fig. 4, a side view, on an enlarged scale, of the feed-rolls and their accessories; Fig. 5, a plan view of the same; Fig. 6, an end view of the same with the driving-gearing removed; Fig. 7, a plan view of the bed-plate with the metal blank in position; Fig. 8, a view in perspective of the stationary type-pallet or chuck; Fig. 9, a similar view of the movable type-pallet; Fig. 10, a similar view of the shaping-punch; Fig. 11, a similar view of the die of the shaping-punch; Fig. 12, a similar view of the slotting-punches and their holder; Fig. 13, a similar view of the die of the slotting-punches, and Fig. 14 a similar view of a finished check.

In the practice of my invention I first cut sheets of metal equal in thickness to that desired for the checks, tags, or other articles which are to be produced into blanks or strips A, which may be either equal to or slightly greater than the length or breadth of said articles, a slight excess of material being preferable, in order that the action of the shaping-punch may be exerted upon the entire periphery of the article, thereby insuring greater regularity and perfection in its contour. The blanks may be made of any desired lengths, as prescribed by convenience and the character and dimensions of the sheets of metal from which they are cut. I then subject a blank, A, to the action of one or more slotting-punches, (in cases where the articles to be made require to be slotted—as, for example, baggage-checks,) one or more printing or marking punches, which form an impression, device, or inscription upon one or upon both sides of the blank, and a shaping or cutting-out punch which severs the article in finished form from the blank. The punches are arranged so as to be simultaneously operated in connection with corresponding anvils and dies, the several punches being applied coincidently to the blank at different points in its length, as closely adjacent as may be, and the blank being moved forward after each punching operation to enable each of the punches to successively act upon a portion of the blank, which is finally cut therefrom by the shaping-punch, and forms a finished check, tag, or other analogous article, *a*. The operations are repeated in similar manner until the stock in the blank is exhausted.

It will be obvious that the several sections *a*, into which the blank A is divided, will be of uniform size, shape, and designation, each having been in turn subjected to the consecutive action of all of the several punches, the relative location of which should be such as that only a sufficient body of metal will be allowed to remain between the sections to insure the proper action of the shaping-punch upon the blank, thus reducing the surplus or waste of metal to a minimum. Further, the performance of each of the above operations—to wit, slotting, printing on one or both sides, and shaping—simultaneously upon the blank and successively upon the different sections effects a material economy of time and labor as compared with the method heretofore practiced, in which said operations have been separately and independently performed by different tools or machines.

To practically and advantageously carry out my invention involves the employment of mechanical structure embodying proper feeding, gaging, and punching devices, and means for their adjustment and operation as required to form the special articles which are to be produced, and sundry mechanisms differing in constructive detail may be found adaptable to the purpose by those skilled in the art. I have, however, further devised a machine possessing the required capabilities, which is represented in the accompanying drawings, the construction and operation of which I will proceed to describe with reference thereto.

A vertical frame or housing, 1, of stout metal, resting upon a base-plate, 2, supports in a bearing, 3, at its top a driving-shaft, 4, which is rotated by the application of any suitable driving-power to a pulley, 5, upon one of its ends. An eccentric or crank, 6, secured upon the opposite end of the driving-shaft, is coupled by a connecting-rod, 7, to a press head, 8, which is fitted between guides 9 on the front of the frame 1, and receives reciprocating movement from the eccentric 6 during the rotation of the shaft.

A punch-block, 10, having a longitudinal dovetailed recess on its lower side for the reception of a series of punches, is firmly secured to the lower end of the press-head 8, a stem, 11, on the top of the punch-block entering a corresponding recess in the press-head, and being clamped therein by a plate, 12, and screw-bolts 13. The firm connection of the press-head and punch-block is further assured, and the canting or twisting of the punch-block prevented by two auxiliary plates, 14, each bolted to the press-head and to the punch-block, and having an inclined set-screw, 66, bearing against the press-head to maintain it tightly in connection therewith and with the punch-block.

A bed-plate, 15, over which the blank A traverses, is secured to a table or support, 16, formed upon the frame 1 below, and in such relation to the punch-block as to admit of the proper action of the punches upon the blank, which is progressively presented to the punches by a pair of feed-rolls, 17 18, mounted in a frame or housings, 19, attached to the table 16, said feed-rolls receiving intermittent rotation from the driving-shaft 4, as presently to be described.

A crank, 20, having a radial slot, 21, is secured upon the end of the driving-shaft 4, adjacent to the eccentric 6, and a stud, 22, which is adjustable within the slot 21 toward and from the center of the driving-shaft 4, is coupled by a connecting-rod, 23, (having a right and left threaded swivel-nut, 29, by which its length may be varied, as required,) to a crank, 24, fitting loosely upon a horizontal stud, 26, secured adjustably in a slot, 69, in the housings 19. A ratchet-wheel, 25, secured to a spur-gear, 27, also loose upon the stud 26, engages a similar gear, 28, upon the shaft of the lower feed-roll, 17. The gear 28 in turn engages a gear, 30, upon the shaft of the upper feed-roll, 18, so that the feed-rolls 17 18 will participate in such rotative movements as may be imparted to the ratchet-wheel 25 and gear 27.

A pawl or dog, 31, having a pin, 32, upon its side and a hand-piece, 33, upon its free end, is pivoted on the pin of the crank 24, to which crank a spring, 34, having a shoulder or stop, 35, formed upon it, is connected. When in the position shown in Figs. 2 and 3 the dog 31 engages the teeth of the ratchet-wheel 25, and thereby imparts to said ratchet-wheel and to the gears 27 28 30 movements of partial rotation, due to the connection of the cranks 20 and 24, the degree of such movements being proportionate to the distance of the stud 22 from the center of the driving-shaft 4, which distance is adjusted in conformity with the length of feed required by the breadth of the checks to be made. By moving the dog 31 so that its pin 32 shall rest upon the opposite side of the shoulder 35 it will be seen that the crank 24 will be vibrated without moving the ratchet-wheel and feed-rolls, and that consequently the feeding movement of the blank will be discontinued.

The upper feed-roll, 18, is mounted in bearings which are movable vertically in the housings 19, and is pressed down upon the blank A, so as to exert upon it the frictional action necessary to insure its movement, by a lever, 36, having a weight, 37, or a spring connected to it at or near one of its ends, and pivoted at the other to the housings 19 by a pin, 38. A series of holes, 39, is formed in two vertical flanges on the caps of the housings, so as to admit of the adjustment of the lever 36 in any desired position longitudinally above the rolls, in order that the pressure of the weight or spring may be exerted as nearly as may be in line with the center of the blank A. A lever, 40, pivoted to the housings, and having an arm, 41, projecting beneath the lever 36, enables the pressure of the latter to be relieved whenever desired, the lever 40 being held in position to support the weighted lever 36 by a stop-pin, 42.

The proper rectilineal traverse of the blank is assured by a stationary gage or gages, 43, secured adjustably to the bed-plate 15 in position to abut against one side of the blank, and by guiding devices bearing upon the blank at points which are respectively in advance of the feed-rolls and adjacent to the shaping-punch, and which may be termed respectively the "entrance" and the "discharge" guides. The entrance-guide consists of a pair of friction-rollers, 44 45, each mounted upon a stem fitting in a slot in a bar, 46, secured to the housings 19 at right angles to the line of traverse of the blank. The roll 44 is adjusted and its bearing clamped in such position in the bar as that the line of the face of the stationary gage 43 will form, when produced, a tangent to it, one side of the blank A bearing against its periphery, and the roll 45 is pressed up to the opposite side of the blank by a spring, 47, bearing at one of its ends against a stud, 48, secured in the slot of the bar 46, and at the other against the block which carries the roll 45. The rolls may be readily adjusted to blanks of different widths, and the yielding bearing of the roll 45 enables it to accommodate itself to inequalities in the blank without cramping on the one hand or undue slackness on the other.

The discharge-guide is composed of a plate, 49, adjustably secured to the bed-plate 15 adjacent to the point of application of the shaping-punch, and carrying a friction-roll, 50, which is mounted in a yielding bearing, 51, and pressed up to the side of the blank opposite the stationary gage by a spring, 52. The function of the discharge-guide is to maintain the blank in proper position to receive the pressure of the shaping or cutting-out punch, and it should be so adjusted as that the roll 50 will bear upon the blank as nearly as practicable at the centers of the spaces between the several sections removed by the shaping-punch.

The machine shown in the drawings, being specially designed and arranged for the manufacture of baggage-checks, embraces mechanism for cutting out the strap-slots, impressing a desired inscription upon either one or both sides of the checks, and finally shaping them into the required form.

In the manufacture of tags, counters, or checks of other descriptions, to which the machine is perfectly adaptable without change other than in the form and number of the punches and dies, one or more of the above operations—as slotting and marking upon one side—may be unnecessary, and the devices designed therefor will be dispensed with in such particular case. In the present instance the blank in its passage from the feed-rolls is first subjected to the action of two slotting-punches, 53, which are secured by caps 54 to a punch-holder, 67, fitted in the longitudinal recess of the reciprocating punch-block 10, and clamped therein by set-screws. A stripper-plate, 55, secured to the bed-plate and having two arms or fingers which project over the blank, prevents the lifting of the latter in the upward movements of the punches, and the punched-out pieces drop through an opening in the bed-plate and table upon a chute, 56, by which they are conducted to a receptacle, 57. The desired device or inscription is next impressed upon the blank by type-punches suited to form letters, characters, or numerals, and suitably arranged in recesses 58, formed in type pallets or chucks 59 60, in which they are clamped by set-screws 61. The pallet 59 is secured in the recess of the punch-block 10, and the pallet 60 is fixed in the bed-plate 15, the type-punches of each pallet acting upon the blank in conjunction with an anvil on the opposite side thereof, said anvils being consequently fixed in the bed-plate and in the punch-block, respectively. In case an inscription is desired upon one side only of the check, it will be obvious that but a single pallet is required, and the other pallet and types are for the time being removed from the machine. The final operation performed upon the blank consists in severing from it in complete form the slotted and marked check, which is effected at each downward stroke of the press-head and punch-block by a shaping or cutting-out punch, 62, corresponding in contour with that desired for the finished check, and secured in the recess of the punch-block 10. A die, 63, fitted in the bed-plate 15, affords the necessary abutment for the punch 62, and the checks as severed from the blank drop through an opening in the bed-plate and table upon a chute, 64, and thence into a receptacle, 65. A stripper, 68, similar to the stripper 55, maintains the blank in position on the bed-plate.

In the operation of the machine the slotting, printing, and shaping punches act simultaneously upon the blank at each downward stroke of the press-head and punch-block, and the partial rotation of the feed-rolls, which is effected during each upward stroke, moves the blank forward for such distance as is necessary to expose to each of the punches a portion of the surface of the blank not theretofore acted upon by said punch, and so located relatively to that portion upon which said punch has acted as to preserve the proper spacing between the several checks, and thereby prevent waste of metal or malformation of the checks.

I claim as my invention and desire to secure by Letters Patent—

1. The combination, substantially as set forth, of a driving-shaft, a press-head reciprocated thereby, slotting, printing, and shaping punches connected to the press-head, and feed-gearing operated intermittently by the driving-shaft.

2. The combination, substantially as set forth, of a press-head, a punch-block, a slotting-punch, a printing-punch, and a shaping-punch.

3. The combination, substantially as set forth, of a reciprocating press-head, a punch-block, a printing and a shaping punch, a stationary gage, a pair of feed-rolls, and yielding entrance and discharge guides to regulate the position of a blank relatively to the gage and punches.

4. The combination of a pair of feed-rolls, a friction-roller mounted in a fixed bearing at right angles to said rolls, and a friction-roller mounted in a yielding bearing and pressed up by a spring in the direction of the first-named friction-roller, these members being combined for joint operation to regulate the position of a blank relatively to the length of the feed-rolls, substantially as set forth.

ELLIS T. JONES.

Witnesses:
J. SNOWDEN BELL,
W. B. LEVAR, Jr.